US012802318B2

(12) United States Patent
Tsukagoshi

(10) Patent No.: US 12,802,318 B2
(45) Date of Patent: Nov. 17, 2026

(54) MEDICAL IMAGE PROCESSING APPARATUS AND METHOD

(71) Applicant: Canon Kabushiki Kaisha, Tokyo (JP)

(72) Inventor: Shinsuke Tsukagoshi, Nasushiobara (JP)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 18/522,839

(22) Filed: Nov. 29, 2023

(65) Prior Publication Data

US 2024/0193829 A1 Jun. 13, 2024

(30) Foreign Application Priority Data

Dec. 8, 2022 (JP) ................................ 2022-196438

(51) Int. Cl.
*G06T 7/00* (2017.01)
*G06T 12/30* (2026.01)

(52) U.S. Cl.
CPC ............ *G06T 12/30* (2026.01); *G06T 7/0012* (2013.01); *G06T 2200/24* (2013.01); *G06T 2207/10081* (2013.01); *G06T 2207/30096* (2013.01); *G06T 2211/408* (2013.01)

(58) Field of Classification Search
CPC . G06T 11/008; G06T 7/0012; G06T 2200/24; G06T 2207/10081; G06T 2207/30096; G06T 2211/408; A61B 6/482
See application file for complete search history.

(56) References Cited

U.S. PATENT DOCUMENTS

| | | | | |
|---|---|---|---|---|
| 11,850,099 | B2 * | 12/2023 | Watanabe | A61B 8/463 |
| 12,254,586 | B2 * | 3/2025 | Solis | G16H 30/40 |
| 2010/0131885 | A1 * | 5/2010 | Licato | A61B 6/482<br>715/764 |
| 2012/0114206 | A1 * | 5/2012 | Avinash | A61B 6/482<br>382/131 |
| 2017/0357754 | A1 * | 12/2017 | Huber | H04L 67/06 |
| 2020/0163637 | A1 * | 5/2020 | Choi | A61B 6/463 |

FOREIGN PATENT DOCUMENTS

JP 2022-065390 A 4/2022

* cited by examiner

*Primary Examiner* — Stephen R Koziol
*Assistant Examiner* — Samuel D Baynes
(74) *Attorney, Agent, or Firm* — Oblon, McClelland, Maier & Neustadt, L.L.P.

(57) ABSTRACT

A processing apparatus for a medical image that is obtained by a multi-energy CT scan according to an embodiment includes processing circuitry. The processing circuitry reconstructs a first image based on scan data that is obtained by a multi-energy CT scan. The processing circuitry causes a display to display side by side, with respect to an area of interest that is specified on the first image, a first numerical value obtained based on the first image and a second numerical value obtained based on a second image that is different from the first image and that is obtained based on the scan data.

12 Claims, 7 Drawing Sheets

MEDICAL IMAGE PROCESSING APPARATUS AND METHOD

CROSS-REFERENCE TO RELATED APPLICATIONS

This application is based upon and claims the benefit of priority from Japanese Patent Application No. 2022-196438, filed on Dec. 8, 2022, the entire contents of which are incorporated herein by reference.

FIELD

Embodiments described herein relate generally to a processing apparatus and a processing method.

BACKGROUND

There has been a technique of, when a region of interest (ROI) is set in a computed tomography (CT) image that is displayed on a display, calculating and displaying a CT value average, a CT value standard deviation, a CT value maximum, a CT value minimum, an area of the ROI, etc., using a plurality of pixels that are contained in the ROI. In this case, the subjects of calculation to be displayed are set and chosen as appropriate.

There is also a technique of generating a medical image that is unique to a multi-energy CT scan by a CT scan enabling discrimination of multiple energies (referred to as a multi-energy CT scan below). In this case, when calculating and displaying analysis values unique to a multi-energy CT scan with respect to a ROI that is set in a medical image, it is necessary to cause an analysis application relating to multi-energy scans to start and execute calculations relating to the analysis values that are specified by a user. For this reason, to display the analysis values unique to multi-energy CT scans on a display, it may take time because of the start of the analysis application, etc.

DETAILED DESCRIPTION

Figure 1:
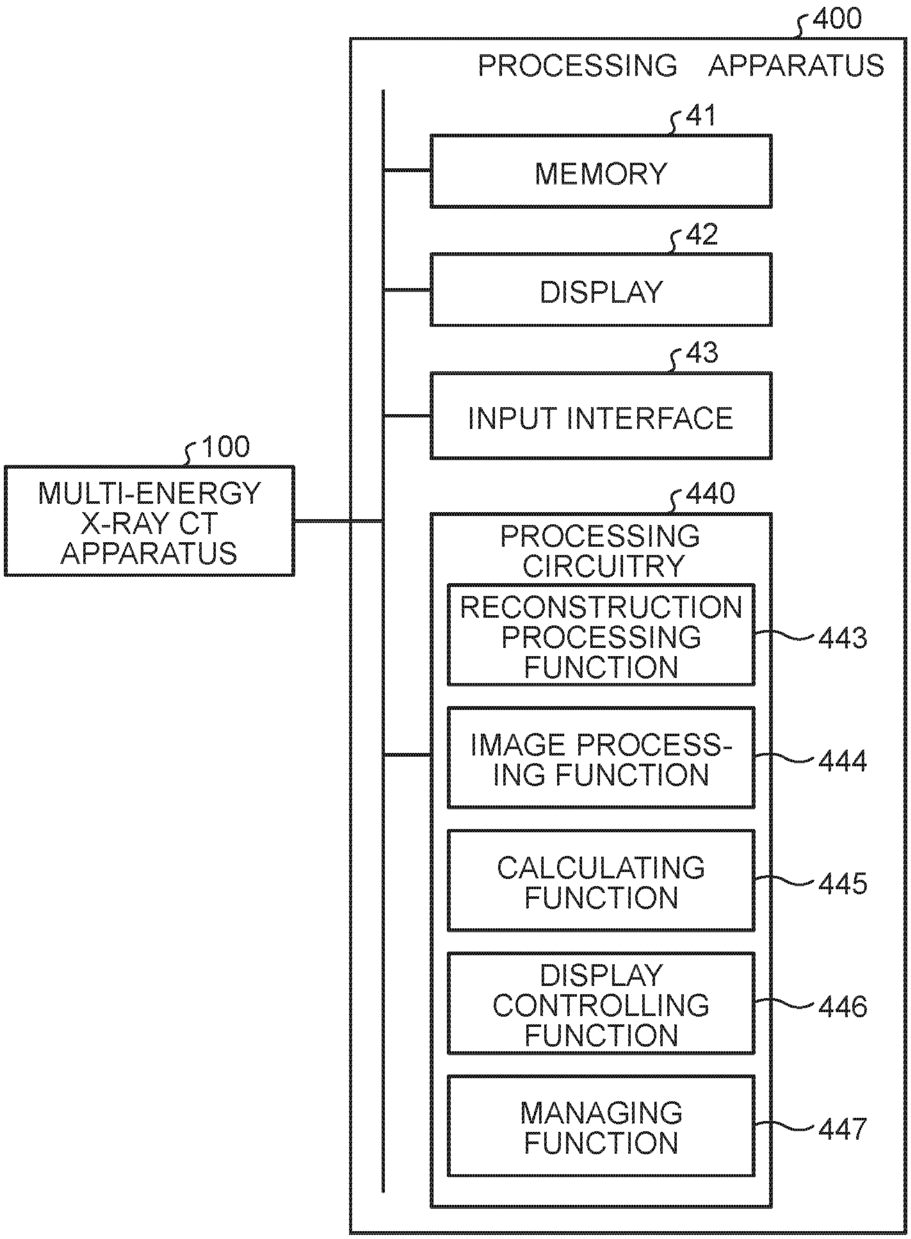
FIG. 1 is a diagram illustrating an example of a configuration of a processing apparatus according to an embodiment.

A processing apparatus for a medical image that is obtained by a multi-energy CT scan according to an embodiment includes processing circuitry. The processing circuitry reconstructs a first image based on scan data obtained by a multi-energy CT scan. The processing circuitry causes a display to display side by side, with respect to the area of interest that is specified on the first image, a first numerical value that is obtained based on the first image and a second numerical value obtained based on a second image that is different from the first image and that is obtained based on the scan data.

With reference to the accompanying drawings, a processing apparatus for a medical image obtained by a multi-energy CT scan and a processing method for a medical image obtained by a multi-energy CT scan will be described below. The multi-energy CT scan refers to a CT scan enabling discrimination of multiple energies (two or more energies) with respect to X-rays. The multi-energy CT scan may be referred to as, for example, a dual-energy CT scan or spectral imaging. In the embodiment, components denoted with the same reference numerals perform the same operations and thus redundant description will be omitted as appropriate.

Embodiment

FIG. 1 is a diagram illustrating an example of a configuration of a processing apparatus 400 according to the embodiment. As illustrated in FIG. 1, the processing apparatus 400 includes a memory 41, a display 42, an input interface 43, and processing circuitry 440. The processing apparatus 400 is connected to a multi-energy X-ray CT apparatus 100 in a wired or wireless manner. The processing apparatus 400 is realized using, for example, a medical image processing server (a work station, or the like) that executes medical image processing, a PACS (Picture Archiving and Communication System) server, or an interpretation terminal device, etc. In other words, the processing method for a medical image obtained by a multi-energy CT scan according to the embodiment may be realized using various types of server apparatuses, in other words, a server apparatus capable of executing the process procedure of the processing method as a program.

The processing apparatus 400 that realizes the above-described processing method may be installed in an X-ray CT apparatus capable of realizing a multi-energy CT scan (multi-energy X-ray CT apparatus). For example, the processing apparatus 400 that realizes the above-described processing method is installed in a console apparatus in the multi-energy X-ray CT apparatus. The multi-energy X-ray CT apparatus is, for example, a dual energy X-ray CT apparatus, a spectral imaging apparatus, a photon counting X-ray computer tomographic apparatus (referred to as a PCCT (Photon Counting Computed Tomography) apparatus below). In order to make specific description, the processing apparatus 400 will be described as one that is installed in the PCCT apparatus.

Note that the processing apparatus 400 that realizes technical features in the embodiment is not limited to being installed in the PCCT apparatus, and the processing apparatus 400 may be installed in a complex apparatus including a nuclear medicine diagnostic apparatus, such as a PET (Positron Emission Tomography) or a SPECT (Single Photon Emission Computed Tomography), and a PCCT apparatus.

Figure 2:
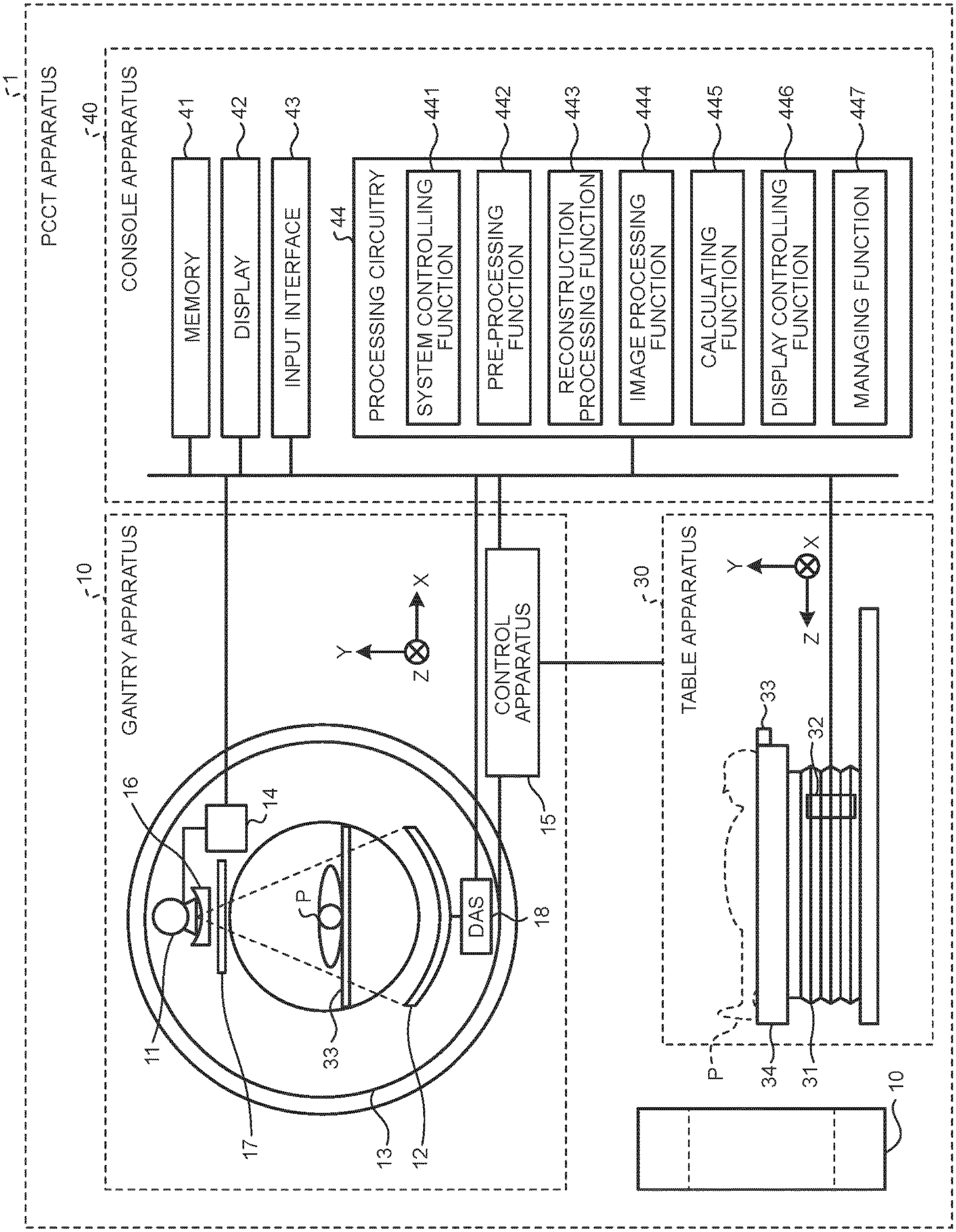
FIG. 2 is a diagram illustrating an example of a configuration of a PCCT apparatus according to the embodiment.

FIG. 2 is a diagram illustrating an example of a configuration of a PCCT apparatus 1 according to the embodiment. As illustrated in FIG. 2, the PCCT apparatus 1 includes a gantry apparatus 10 that is also referred to as a gantry, a table apparatus 30, and a console apparatus 40. The processing apparatus 400 that realizes the technical features in the embodiment is installed in the console apparatus 40 as illustrated in FIG. 2.

Note that, in the embodiment, a longitudinal direction of a rotation axis of a rotation frame 13 in a non-tilt state is defined as a Z-axis direction, a direction that is orthogonal to the Z-axis direction and that extends from a rotation center to a pillar that supports the rotation frame 13 is defined as an X-axis, and a direction that is orthogonal to the Z-axis and the X-axis is defined as a Y-axis. For convenience of description, a plurality of the gantry apparatuses 10 are illustrated; however, there is the single gantry apparatus 10 according to the configuration of the actual PCCT apparatus 1.

The gantry apparatus 10 and the table apparatus 30 operate according to operations by the user via the console apparatus 40 or operations from the user via an operation unit that is provided in the gantry apparatus 10 or the table apparatus 30. The user is, for example, a doctor, a radiographer, and a service person for the PCCT apparatus 1. The gantry apparatus 10, the table apparatus 30, and the console apparatus 40 are connected in a wired or wireless manner such that they can communicate with one another.

The gantry apparatus 10 is an apparatus including an imaging system that applies X-rays to a subject P and collects projection data from detection data on X-rays having passed through the subject P. The gantry apparatus 10 includes an X-ray tube 11, an X-ray detector 12, the rotation frame 13, an X-ray high-voltage apparatus 14, a control apparatus 15, a wedge 16, a collimator 17, and a DAS (Data Acquisition System) 18.

The X-ray tube 11 is a vacuum tube that generates X-rays by applying thermal electrons from a cathode (filament) to an anode (target) using application of a high voltage and supply of a filament current from the X-ray high-voltage apparatus 14. Collision of the thermal electrons with the target generates X-rays. The X-rays generated in a tube focal spot in the X-ray tube 11 pass through an X-ray radiation window in the X-ray tube 11, are formed into, for example, a cone beam form via the collimator 17, and are applied to the subject P. For example, a rotating-anode X-ray tube that generates X-rays by applying thermal electrons to a rotating anode is an example of the X-ray tube 11.

The X-ray detector 12 detects photons of the X-rays that are generated by the X-ray tube 11. Specifically, the X-ray detector 12 detects the X-rays emitted from the X-ray tube 11 and having passed through the subject P on a photon basis and outputs an electric signal corresponding to the X-ray dosage to the DAS 18. In other words, the X-ray detector 12 is realized using a photon-counting X-ray detector. The X-ray detector 12, for example, includes a plurality of detection element rows in which a plurality of detection elements (also referred to as X-ray detection elements) are arrayed in a fan angle direction (also referred to as a channel direction) along an arc about a focal spot of the X-ray tube 11. In the X-ray detector 12, the detection element rows are arrayed flat along the Z-axis direction. In other words, the X-ray detector 12, for example, has a configuration in which a plurality of detection element rows in which the detection elements are arrayed flat along the cone angle direction (also referred to as a row direction or a slice direction).

There are, as the PCCT apparatus 1, various types including, for example, a Rotate/Rotate-Type (a third-generation CT) in which the X-ray tube 11 and the X-ray detector 12 rotate around the subject P as a unit and a Stationary/Rotate-Type (a fourth-generation CT) in which a large number of X-ray detection elements that are arrayed into a ring shape are fixed and only the X-ray tube 11 rotates around the subject P and any of the types is applicable to the embodiment.

The X-ray detector 12 is a direct conversion detector including a semiconductor device that converts incident X-rays into an electric charge. The X-ray detector 12 of the embodiment includes, for example, at least one high-voltage pole, at least one semiconductor crystal, and a plurality of read electrodes. The semiconductor element is also referred to as an X-ray conversion element. The semiconductor crystal is realized using, for example, cadmium telluride (CdTe) or cadmium Zinc telluride (CdZnTe (CZT)). In the X-ray detector 12, electrodes are provided on two surfaces that are opposed to each other with the semiconductor crystal in between and that are orthogonal to the Y-direction. In other words, a plurality of anodes (also referred to as read electrodes or pixel electrodes) and a cathode (also referred to as a common electrode) are provided in the X-ray detector 12 with the semiconductor crystal in between.

A bias voltage is applied between the read electrode and the common electrode. In the X-ray detector 12, when an X-ray is absorbed into the semiconductor crystal, electron-hole pairs are generated and the electrons move to an anode (read electrode) side and holes move to a cathode side, so that a signal on detection of the X-rays is output from the X-ray detector 12 to the DAS 18.

Note that the X-ray detector 12 may be an indirect conversion photon counting X-ray detector that converts incident X-rays indirectly into an electric signal. The X-ray detector 12 is an example of the X-ray detector.

The rotation frame 13 is an annular frame that supports the X-ray tube 11 and the X-ray detector 12 such that the X-ray tube 11 and the X-ray detector 12 are opposed to each other and that is caused by the control apparatus 15 to rotate the X-ray tube 11 and the X-ray detector 12. The rotation frame 13 further includes and supports the X-ray high-voltage apparatus 14 and the DAS 18 in addition to the X-ray tube 11 and the X-ray detector 12. The rotation frame 13 is rotatably supported by a non-rotation part (for example, a fixed frame of which illustration is omitted in FIG. 2) of the gantry apparatus 10. A rotation mechanism includes, for example, a motor that generates a rotation drive force and a bearing that transmits the rotation drive force to the rotation frame 13 to rotate the rotation frame 13. The motor is provided in, for example, the non-rotation part and the bearing is physically connected to the rotation frame 13 and the motor and the rotation frame 13 rotates according to a rotation force of the motor.

Non-contact or contact communication circuitry is provided in each of the rotation frame 13 and the non-rotation part and thus a unit that is supported by the rotation frame 13 and the non-rotation part or an external apparatus of the gantry apparatus 10 communicate with each other. For example, when optical communication is employed as a non-contact communication method, detection data that is generated by the DAS 18 is transmitted by optical communication from a transmitter that is provided in the rotation frame 13 and that includes a light emitting diode (LED) to a receiver that is provided in the non-rotation part of the gantry apparatus 10 and that includes a photodiode and is further transferred by a transmitter from the non-rotation part to the console apparatus 40. As a communication method, a contact data transmission method using a slip ring and an electrode brush may be employed in addition to a non-contact data transfer of a capacitive coupling system or a radio wave system. The rotation frame 13 is an example of a rotation unit.

The X-ray high-voltage apparatus 14 includes electric circuitry, such as a transformer and a rectifier, and includes a high-voltage generation apparatus having a function of generating a high voltage to be applied to the X-ray tube 11 and an X-ray control apparatus that controls an output voltage corresponding to the X-rays that are applied by the X-ray tube 11. The high-voltage generation apparatus may be a transformer type or an inverter type. The X-ray high-voltage apparatus 14 may be provided in the rotation frame 13 or may be provided on the side of the fixed frame of the gantry apparatus 10. The X-ray high-voltage apparatus 14 is an example of an X-ray high-voltage unit.

The control apparatus 15 includes processing circuitry including a central processing unit (CPU) and a drive mechanism, such as a motor and an actuator. The processing circuitry includes, as hardware resources, a processor, such as a CPU or a micro processing unit (MPU), and a memory, such as a read only memory (ROM) or a random access memory (RAM).

The control apparatus 15 may be realized using a processor, such as a graphics processing unit (GPU), an application specific integrated circuit (ASIC), or a programmable logic device (for example, a simple programmable logic device (SPLD), a complex programmable logic device (CPLD) or a field programmable gate array (FPGA)).

When the processor is, for example, a CPU, the processor reads programs that are saved in a memory and executes the programs, thereby implementing the functions. On the other hand, when the processor is an ASIC, instead of saving the programs in a memory, the functions are directly installed as logic circuitry in the circuitry of the processor. Each processor of the embodiment is not limited to the case where each processor is configured as a single set of circuitry, and multiple independent circuits may be combined to configure a single processor to implement the functions. Furthermore, the components may be integrated into one processor to implement functions thereof.

The control apparatus 15 has a function of receiving an input signal from an input interface that is attached to the console apparatus 40 or the gantry apparatus 10 and controlling operations of the gantry apparatus 10 and the table apparatus 30. For example, in response to input signals, the control apparatus 15 performs control to cause the rotation frame 13 to rotate, control to cause the gantry apparatus 10 to tilt, and control to cause the table apparatus 30 and a tabletop 33 to operate. Note that the control for causing the gantry apparatus 10 to tilt may be implemented by the control apparatus 15 by causing the rotation frame 13 to rotate about an axis parallel to the X-axis direction according to inclination angle (tilt angle) information that is input by the input interface that is attached to the gantry apparatus 10. The control apparatus 15 controls various types of components, such as the gantry apparatus 10 and the table apparatus 30, on execution of a photon counting CT scan according to an imaging protocol including a scan condition (imaging condition) that is set by the user based on an examination order. A photon counting CT scan is not a conventional integrated CT scan and is, for example a CT scan that counts photons one by one.

The control apparatus 15 may be provided in the gantry apparatus 10 or may be provided in the console apparatus 40. Note that the control apparatus 15 may be configured to directly install the programs in circuitry of the processor instead of saving the programs in the memory. The control apparatus 15 is an example of the controller.

The wedge 16 is a filter for adjusting the dosage of X-rays applied from the X-ray tube 11. Specifically, the wedge 16 is a filter that transmits and attenuates X-rays that are applied from the X-ray tube 11 such that the X-rays applied to the subject P from the X-ray tube 11 have a predetermined distribution. For example, the wedge 16 is a wedge filter or a bow-tie filter and is a filter obtained by processing aluminum into a given target angle and a given thickness.

The collimator 17 is a lead plate for narrowing X-rays having passed through the wedge 16 into an X-ray radiation area and forms slits according to combination of a plurality of lead plates, or the like. The collimator 17 is sometimes referred to as an X-ray diaphragm.

S of sets of counting circuitry. Each of the counting circuits includes an amplifier that performs amplification processing on an electric signal that is output from each of the detection elements of the X-ray detector 12 and an A/D converter that converts the amplified electric signal into a digital signal and generates detection data that is a result of counting processing using a detection signal of the X-ray detector 12. The result of the counting processing is data on allocation of the number of photons of X-rays per energy bin. An energy bin corresponds to an area of energy with a given width. For example, the DAS 18 counts photons (X-ray photons) deriving from X-rays that are applied from the X-ray tube 11 and pass through the subject P, and generates the result of the counting processing of discriminating the energy of the counted photons as the detection data.

The detection data that is generated by the DAS 18 is transferred to the console apparatus 40. The detection data is a set of channel numbers of detection elements of the source of generation, row numbers, view numbers representing collected views (also referred to as angles of projection), and values representing dosages of detected X-rays. Note that the order in which views are collected (times of collection) may be used as the view numbers or numbers (for example, 1 to 1000) representing angles of rotation of the X-ray tube 11 may be used. Each of the sets of counting circuitry in the DAS 18 is realized using a group of sets of circuitry on which circuitry elements capable of generating detection data are mounted. In the embodiment, simple "detection data" refers to both pure raw data before pre-processing to be performed thereon and raw data obtained by performing the pre-processing on the pure raw data. Note that the data before the pre-processing (detection data) and the data after the pre-processing are sometimes collectively referred to as projection data.

The table apparatus 30 is an apparatus on which the subject P to be scanned is laid and that moves the subject P and includes a base 31, a table drive apparatus 32, the tabletop 33, and a support frame 34. The base 31 is a casing that supports the support frame 34 movably in a vertical direction. The table drive apparatus 32 is a motor or an actuator that moves the tabletop 33 on which the subject P is laid in a longitudinal direction of the tabletop 33. The tabletop 33 that is provided on a top surface of the support frame 34 is a board on which the subject P is laid. The table drive apparatus 32 may move, in addition to the tabletop 33, the support frame 34 in the longitudinal direction of the tabletop 33.

The console apparatus 40 includes the memory 41, the display 42, the input interface 43, and processing circuitry 44. Data communication between the memory 41, the display 42, the input interface 43, and the processing circuitry

44 may be performed via, for example, a bus. The console apparatus 40 is described independently from the gantry apparatus 10; however, the gantry apparatus 10 may include the console apparatus 40 or part of each component of the console apparatus 40.

The memory 41 is realized using, for example, a semiconductor memory device, such as a random access memory (RAM) or a flash memory, a hard disk drive (HDD), a solid state drive (SSD), or an optical disk. The memory 41 may be a drive apparatus that reads or writes various sets of information between a portable storage medium, such as a compact disc (CD), a digital versatile disc (DVD), or a flash memory, and a semiconductor memory device, such as a random access memory (RAM).

The memory 41 stores, for example, the detection data that is output from the DAS 18, projection data that is generated by a pre-processing function 442, a reconstruction image that is reconstructed by a reconstruction processing function 443, and an analysis value that is calculated by a calculating function 445. The reconstruction image is, for example, three-dimensional CT image data (volume data) or two-dimensional CT image data. For example, the projection data from which the reconstruction image originates, etc., may be referred to as scan data. The scan data is obtained by a multi-energy CT scan on the subject P. Specifically, the scan data is count data obtained by counting X-rays according to the multiple energies. The scan data is stored in the memory 41. The storage of the memory 41 may be in the PCCT apparatus 1 or in an external storage apparatus that is connected via a network.

The memory 41 stores an imaging protocol including a scan condition. The scan condition is a condition on imaging that is used in the multi-energy CT scan that is executed by the PCCT apparatus 1. The scan condition includes, for example, a tube voltage, a tube current, a scan speed, a total number of multiple energy bins, and energy ranges of the multiple energies.

The imaging protocol includes, for example, a plurality of scans including multi-energy CT scans and a plurality of scan conditions corresponding to the scans. The scans include, for example, scanography on the subject P and any one or both of non-contrast-enhanced (Non-CE) imaging and/or contrast-enhanced (CE) imaging. Additionally, the imaging protocol includes a plurality of reconstruction conditions corresponding to the scans. The reconstruction conditions include, for example, ones on a reconstruction function, whether image processing is performed, intensities of various types of filters on image processing, and whether artifact reduction processing is performed. Note that a plurality of reconstruction conditions may be set for detection data (a projection data group, or the like) obtained by a single multi-energy CT scan.

Note that the scan condition and the reconstruction conditions may be collectively referred to as an image generation condition. In this manner, the imaging protocol is generated, for example, according to a CT examination on the subject P. Thus, the imaging protocol may be referred to as a scan plan corresponding to the subject P.

The memory 41 stores a program that relates to execution of each of a system controlling function 441, the pre-processing function 442, the reconstruction processing function 443, an image processing function 444, the calculating function 445, a display controlling function 446, and a managing function 447. The memory 41 is an example of a storage unit.

The display 42 displays various types of information under the control of the display controlling function 446. For example, the display 42 outputs a medical image (CT image) that is generated by the processing circuitry 44 and a graphical user interface (GUI) for receiving various types of operations from the user. The display 42 displays an operation screen that relates to a setting for various types of scan conditions. The display 42 displays analysis values that are calculated by the calculating function 445. The analysis values will be described below.

It is possible to appropriately use, as the display 42, for example, a liquid crystal display (LCD), a cathode ray tube (CRT) display, an organic EL electro luminescence display (OELD), a plasma display, or any other display. The display 42 may be provided in the gantry apparatus 10. The display 42 may be a desktop display or may be configured using a tablet terminal device capable of radio communication with the console apparatus 40, etc. The display 42 is an example of the display unit.

The input interface 43 receives various types of input operations from the user, converts the received input operations into electric signals, and outputs the electric signals to the processing circuitry 44. For example, the input interface 43 receives, from the user, the scan conditions for on collecting projection data, the imaging protocol, the reconstruction condition on reconstructing CT image data, and image processing condition on post processing on CT image data. The post processing may be performed in the console apparatus 40 or external work station. The post processing may be performed in both the console apparatus 40 and the work station at a time.

The post processing that is defined herein is an idea referring to processing on an image that is reconstructed by the reconstruction processing function 443. The post processing includes, for example, a multi planar reconstruction (MPR) display of the reconstruction image and rendering of volume data. It is possible to appropriately use, as the input interface 43, for example, a mouse, a keyboard, a trackball, a switch, a button, a joystick, a touch pad, and a touch panel display.

The input interface 43 sets a region of interest (ROI) according to an instruction of the user on the medical image that is displayed on the display 42. When three-dimensional volume data (for example, various types of rendering images) is displayed as the medical image on the display 42, the input interface 43 may set a volume of interest (VOI) on the three-dimensional volume data according to an instruction of the user. The input interface 43 inputs items of analysis values according to an instruction of the user. The items of the analysis values will be described below.

Note that, in the embodiment, the input interface 43 is not limited to one including physical operational parts, such as a mouse, a keyboard, a track ball, a switch, a button, a joystick, a touch pad, and a touch panel display. For example, examples of the input interface 43 include electric signal processing circuitry that receives an electric signal corresponding to an input operation from an external input device that is provided separately from the apparatus and that outputs the electric signal to the processing circuitry 44. The input interface 43 is an example of an input unit. The input interface 43 may be provided in the gantry apparatus 10. The input interface 43 may be configured using a tablet terminal device capable of communicating with the main unit of the console apparatus 40, or the like.

The processing circuitry 44 controls entire operations of the PCCT apparatus 1 according to an input operation electric signal that is output from the input interface 43. For example, the processing circuitry 44 includes, as hardware resources, a processor, such as a CPU, a MPU or a graphics processing unit (GPU), and a memory, such as a ROM or a RAM. Using a processor that executes a program that is loaded into a memory of the processing circuitry 44, the processing circuitry 44 executes the system controlling function 441, the pre-processing function 442, the reconstruction processing function 443, the image processing function 444, the calculating function 445, the display controlling function 446, and the managing function 447. Each of the functions 441 to 447 is not limited to the case where the function is realized using a single set of processing circuitry. A plurality of independent processors may be combined to configure processing circuitry and the respective processors may execute programs, thereby implementing the respective functions 441 to 447.

The system controlling function 441 controls each of the functions of the processing circuitry 44 according to an input operation that is received from the user via the input interface 43. The system controlling function 441 reads a control program that is stored in the memory 41, loads the control program into the memory in the processing circuitry 44, and controls each unit of the PCCT apparatus 1 according to the loaded control program. The processing circuitry 44 that implements the system controlling function 441 is an example of a system controller.

The pre-processing function 442 generates projection data obtained by performing logarithmic transformation processing, offset correction processing, sensitivity correction processing between channels, pre-processing, such as beam hardening correction, on the detection data that is output from the DAS 18. Generation of projection data complies with the content of known processing, and thus description thereof will be omitted. The processing circuitry 44 that implements the pre-processing function 442 is an example of the pre-processing.

According to the reconstruction conditions, the reconstruction processing function 443 generates CT image data by performing reconstruction processing using filtered back projection (FBP method) on the projection data that is generated by the pre-processing function 442. The reconstruction processing includes various types of processing including various types of correction processing, such as scatter correction and beam hardening correction, and application of a reconstruction function under the reconstruction conditions. Note that the reconstruction processing that is executed by the reconstruction processing function 443 is not limited to the FBP method, and known processing, such as successive approximation and a deep neural network that outputs a reconstruction image by inputting projection data may be used. The reconstruction processing function 443 stores the reconstructed CT image data in the memory 41. The processing circuitry 44 that implements the reconstruction processing function 443 is an example of the reconstruction processing unit.

For example, the reconstruction processing function 443 reconstructs a first image based on scan data obtained by a multi-energy CT scan. The first image is, for example, an energy cumulative image corresponding to all energies that are cumulated over multiple energies that relate to X-ray detection or three-dimensional volume data corresponding to the all energies.

The reconstruction processing function 443 may reconstruct a second image different from the first image based on the scan data. Note that the reconstruction processing function 443 may reconstruct a second image based on the scan data with respect to the ROI that is set on the first image. The second image is an image obtained using the count data corresponding to X-ray multiple energies.

Reconstruction processing that is realized by the reconstruction processing function 443 is not limited to generation of an image based on reconstruction pre-data, such as the projection data, and has a function of implementing the reconstruction processing in a broad sense. For example, based on the reconstruction pre-data, the reconstruction processing function 443 generates a reference material image, a virtual monochromatic X-ray image, a virtual non-contrast (VNC) image, an iodine map image, an effective atomic number image, an electron density image, and a plurality of energy images, etc. The reference material image, the virtual monochromatic X-ray image, the VNC image, the iodine map image, the effective atomic number image, the electron density image, and the energy images correspond to, for example, an image type of the second image.

The reference material image is an image that relates to a reference material. The reference material is, for example, water, iodine, or the like. The reference material image is, for example, a water image presenting a water content (for example, an abundance ratio of water) per pixel and an iodine image presenting an iodine content (for example, an abundance ratio of iodine) per pixel. The virtual monochromatic X-ray image corresponds to monochromatic X-rays having a specific one energy component (keV) in the energy of X-rays (for example, white X-rays) that are generated in the X-ray tube 11. The virtual monochromatic X-ray image corresponds to a medical image that is captured virtually using specific monochromatic X-rays.

The VCN image is generated from an image after radiation. The iodine map image is a medical image presenting how much a contrast agent containing iodine as a component is stained. For example, with respect to a type of an element in each of a plurality of voxels, when the voxel consists of a single element, the effective atomic number image is a medical image presenting the type of the element. When each of the voxels consists of a plurality of voxels, the effective atomic number image is a medical image presenting an average atomic number. In other words, an effective atomic number is, when it is assumed that a voxel is replaced with a single atom, an atomic number corresponding thereto. For example, the effective atomic number image corresponds to an image corresponding to a feature X-ray (k-edge) in X-rays that are generated in the X-ray tube 11.

The electron density image is a medical image presenting the number of electrons that are estimated to be present in a unit volume. The electron density image corresponds to, for example, a medical image presenting a density of a contrast agent. Each of the energy images corresponds to a medical image that is generated based on the detection data that is collected with respect to each of the energy bins in the PCCT apparatus 1. It is possible to appropriately use the content of known processing as reconstruction in which the reconstruction processing function 443 generates a medical image, and thus description thereof will be omitted.

According to an input operation that is received from the user via the input interface 43, the image processing function 444 converts the CT image data that is generated by the reconstruction processing function 443 into a tomographic image data of a freely-selected cross-section and three-dimensional image data by a known method. Note that generation of three-dimensional image data may be performed directly by the reconstruction processing function 443. It is possible to use known processing as various types of image processing that are realized by the image processing function 444, and thus description thereof will be omitted. The processing circuitry 44 that implements the image processing function 444 is an example of an image processing unit.

The calculating function 445 calculates, with respect to the ROI that is set on the first image, the first numerical value based on the first image. The first numerical value is an analysis value that relates to the first image and is, for example, a CT value average based on a plurality of CT values in the ROI, a standard deviation based on the CT values in the ROI, a CT value maximum in the ROI, or a CT value minimum in the ROI. The processing circuitry 44 that implements the calculating function 445 is an example of the calculator.

Specifically, prior to calculation of the first numerical value, a plurality of items that relate to the first numerical values that can be specified on the display 42 (referred to as first items below) are displayed on the display 42 under the control of the display controlling function 446. The first items are, as described above, for example, an average, a standard deviation, a maximum, and a minimum. According to the first item that is specified according to an instruction of the user via the input interface 43, the calculating function 445 calculates the first numerical value corresponding to the specified first item. The first items are displayed on the display 42, for example, when a screen for setting an ROI or scan conditions are set. A known method is applicable to the process of calculating the first numerical value with respect to the ROI on the first image, and thus description thereof will be omitted.

The calculating function 445 calculates, with respect to the ROI that is set on the first image, a second numerical value based on the second image. The second numerical value is, in the second image, an analysis value that relates to an area in the same position as that of the ROI that is specified on the first image. The second numerical value is, for example, an iodine concentration, an electron density, an atomic number, and a result of discriminating materials (for example, a water element, an iodine element, a calcium element, an iron element, a gold component, and a platinum element) and depends on the type of the second image.

Specifically, prior to calculation of the second numerical value, a plurality of items that relate to the second numerical values that can be specified on the display 42 (referred to as second items below) are displayed on the display 42 under the control of the display controlling function 446. The second items are, as described above, for example, an iodine concentration, an electron density, an atomic number, and a result of discriminating materials. According to the second item that is specified according to an instruction of the user via the input interface 43, the calculating function 445 calculates the second numerical value corresponding to the specified second item. The second items are displayed on the display 42, for example, when the screen for setting an ROI or scan conditions are set. A known method is applicable to the process of calculating the second numerical value, and thus description thereof will be omitted.

Prior to execution of a scan on the subject P, the display controlling function 446 causes the display 42 to display a screen for setting scan conditions and an imaging protocol. The display controlling function 446 may cause the display 42 to display a specification screen allowing a user to specify a first item and a second item. Reconstruction of the first image drives the display controlling function 446 to cause the display 42 to display the reconstructed first image. The display controlling function 446 causes the display 42 to display the screen for setting an ROI on the first image.

When a helical scan is executed on the subject P, the display controlling function 446, for example, causes the display 42 to display, as the first image, a slice image of an axial cross-section corresponding to a start position of the helical scan among a plurality of slice images that are generated from volume data along a craniocaudal direction (a Z-direction) of the subject P. When a volume scan is executed on the subject P, the display controlling function 446, for example, causes the display 42 to display, as the first image, a slice image of an axial cross-section corresponding to an intermediate position in the craniocaudal direction (the Z-direction) of the subject P among a plurality of slice images that are generated from volume data. The start position and the intermediate position in the helical scan correspond to a reference position of the first image.

The display controlling function 446 causes the display 42 to display side by side, with respect to the ROI that is specified on the first image, the first numerical value obtained based on the first image and the second numerical value obtained based on the second image that is different from the first image and that is obtained based on the scan data. Specifically, the display controlling function 446 causes the display 42 to display the first numerical value and the second numerical value that are calculated together with the first image. Note that the display controlling function 446 may cause the display 42 to further display the second image that relates to the second numerical value. The processing circuitry 44 that implements the display controlling function 446 corresponds to a display controller.

The managing function 447 manages the second image and the second numerical value in association with the first image. Specifically, using header information of time-series data that relates to the first image, the managing function 447 manages the first image and the second numerical value in association with the first image. Note that, using header information that relates to counting of X-ray photons, the managing function 447 may manage the second image and the second numerical value in association with the first image. Accordingly, the second image and the second numerical value are stored in the memory 41 in association with the first image. The processing circuitry 44 that implements the managing function 447 corresponds to a management unit.

Figure 3:
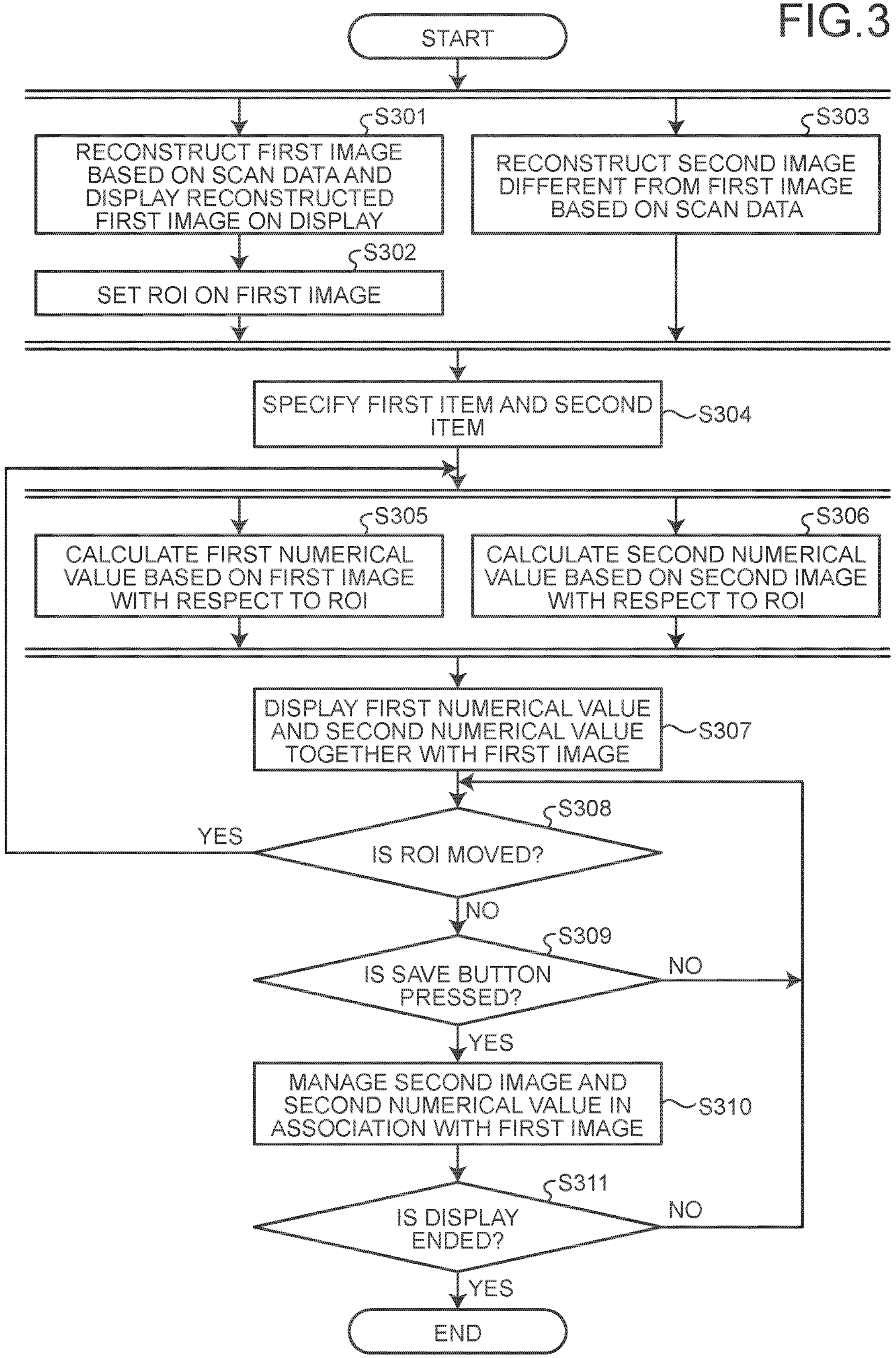
FIG. 3 is a flowchart illustrating an example of a procedure of medical image processing according to the embodiment.

The medical image processing that is implemented by the PCCT apparatus 1 according to the embodiment that is configured as described above will be described using FIGS. 3 to 7. FIG. 3 is a flowchart illustrating an example of a procedure of the medical image processing.

Medical Image Processing

Step S301

By the reconstruction processing function 443, the processing circuitry 44 reconstructs a first image based on scan data. By the display controlling function 446, the processing circuitry 44 causes the display 42 to display the first image.

Step S302

By the display controlling function 446, the processing circuitry 44 causes the display 42 to display the screen for setting an ROI on the first image. According to an instruction of the user via the input interface 43, an ROI is set on the first image. Note that setting an ROI that is processing of the present step is executable at any stage as needed in the procedure of the medical image processing.

Figure 4:
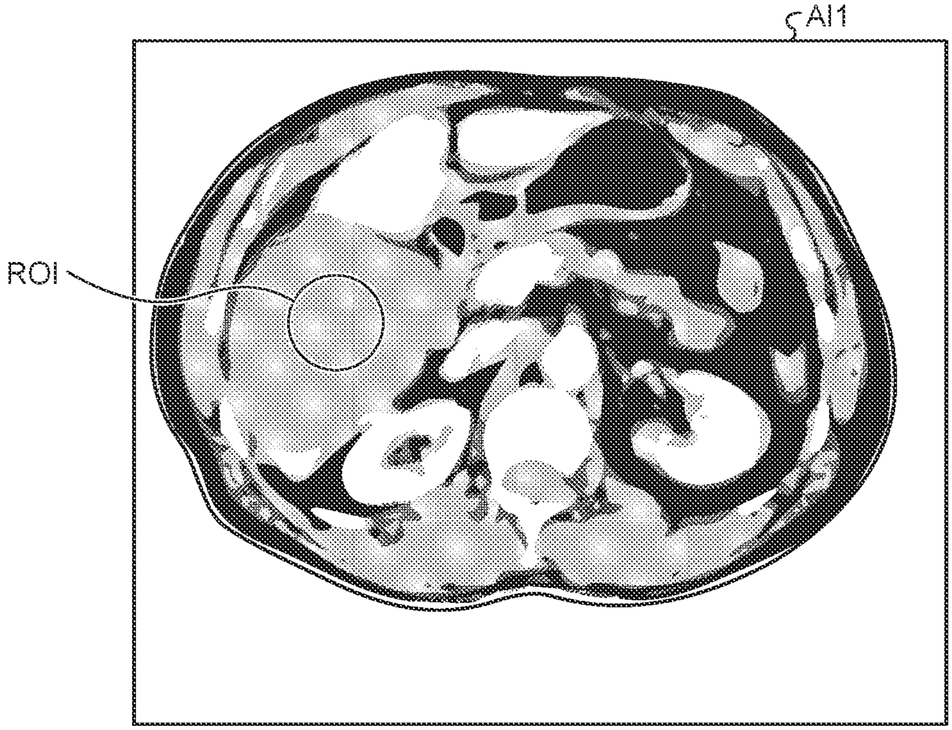
FIG. 4 is a diagram illustrating an example of a first image that is displayed on a display and a region of interest (ROI) that is set on the first image according to the embodiment.

FIG. 4 is a diagram illustrating an example of a first image AI1 that is displayed on the display 42 and an ROI that is set on the first image AI1. As illustrated in FIG. 4, the ROI is presented in a circle; however, the shape of the ROI is not limited to a circle, and any shape may be set. When volume data, such as various types of rendering images, is displayed as the first image on the display 42, the display controlling function 446 causes the display 42 to display an interest volume that is set in the volume data.

Step S303

Figure 5:
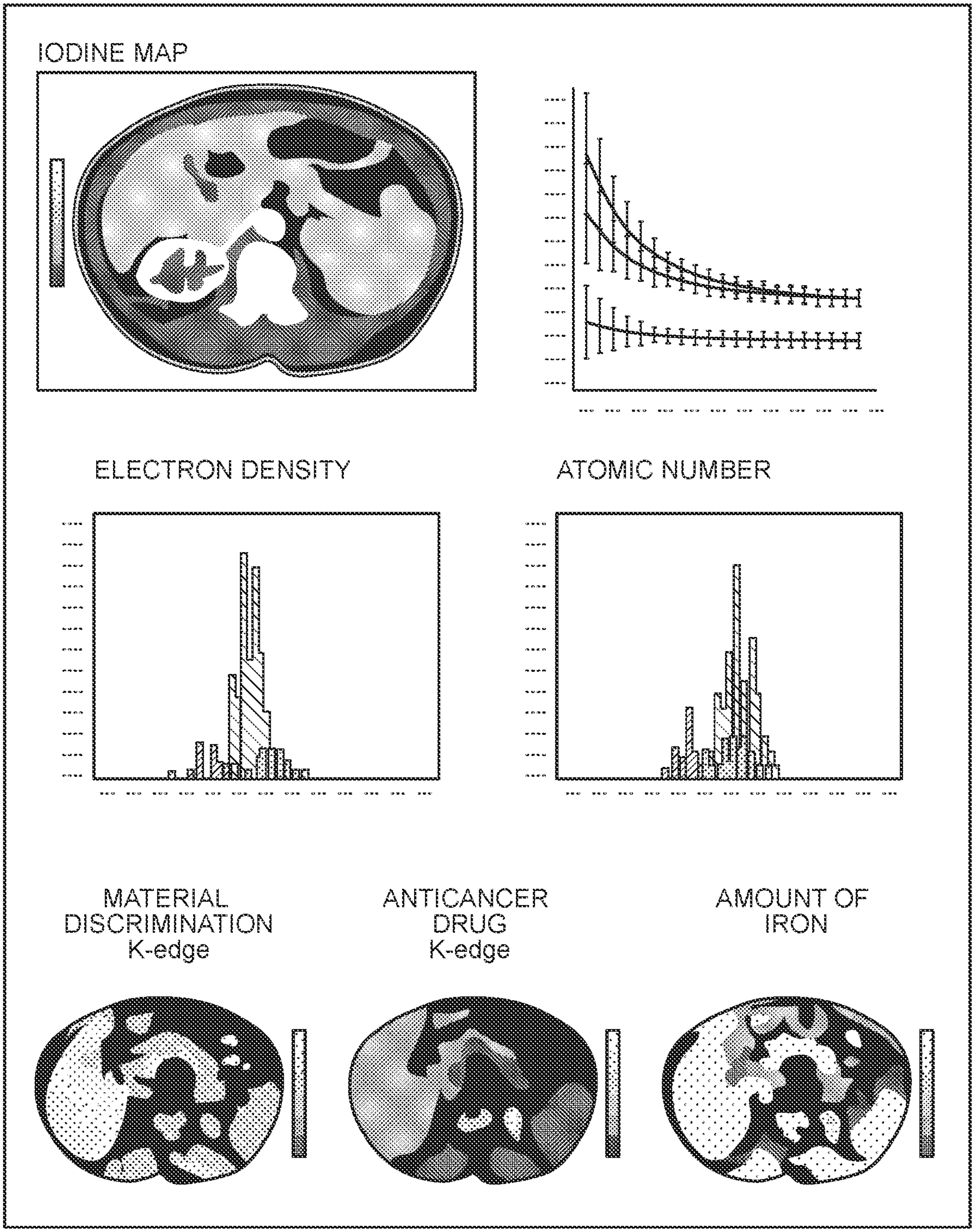
FIG. 5 is a diagram illustrating examples of a second image according to the embodiment.

By the reconstruction processing function 443, the processing circuitry 44 reconstructs a second image based on the scan data. The reconstruction processing function 443 causes the memory 41 to store the reconstructed second image. FIG. 5 is a diagram illustrating examples of the second image. As illustrated in FIG. 5, the second image is, for example, an image presenting an iodine map, an image presenting a distribution of atomic numbers, an image presenting a distribution of electron densities, a k-edge image that is used for material discrimination, a k-edge image that is used to detect an anticancer drug (platinum), or an image presenting a distribution of amounts of iron.

Step S304

By the display controlling function 446, the processing circuitry 44 causes the display 42 to display a specification screen allowing specification of a first item that relates to the first numerical value and a second item that relates to a second numerical value. A first item and a second item are specified according to instructions of the user via the input interface 43.

Figure 6:
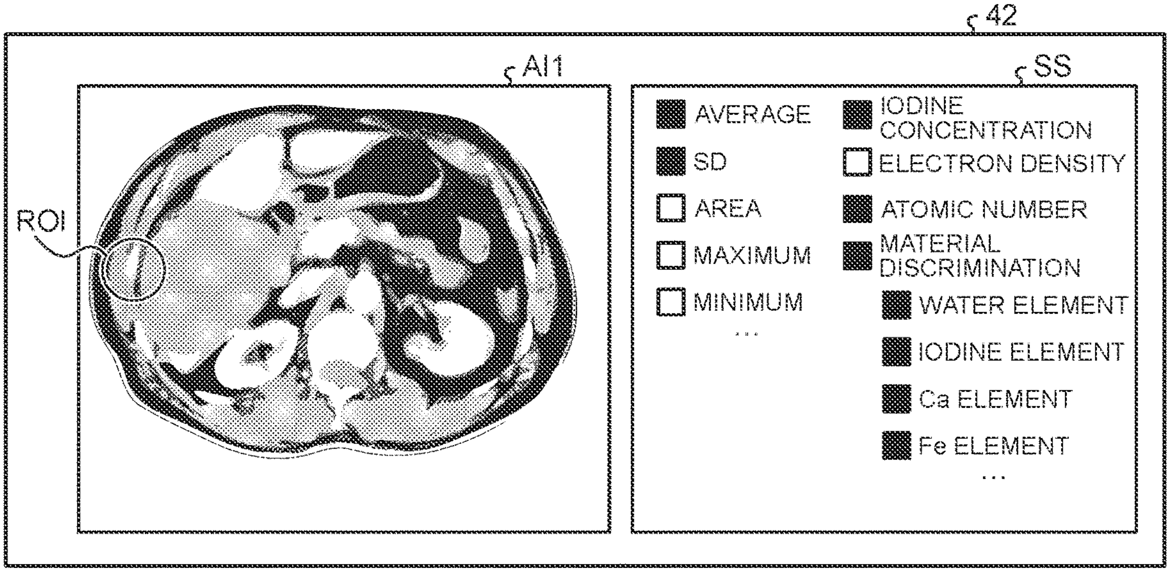
FIG. 6 is a diagram illustrating an example of the first image and a specification screen that are displayed on the display according to the embodiment.

FIG. 6 is a diagram illustrating an example of the first image AI1 and a specification screen SS that are displayed on the display 42. As illustrated in FIG. 6, an average, a standard deviation SD, etc., are specified as the first items. As illustrated in FIG. 6, an iodine concentration, an atomic number, and a water element, an iodine element, a calcium element (Ca element), an iron element (Fe element), etc., in material discrimination are specified as the second items.

Step S305

When a ROI measurement button is pressed according to an instruction of the user via the input interface 43, by the calculating function 445, the processing circuitry 44 calculates first numerical values corresponding to the specified first items based on the first image with respect to the set ROI.

Step S306

When a ROI measurement button is pressed according to an instruction of the user via the input interface 43, by the calculating function 445, the processing circuitry 44 calculates second numerical values corresponding to the specified second items based on the second image with respect to the set ROI.

Step S307

Figure 7:
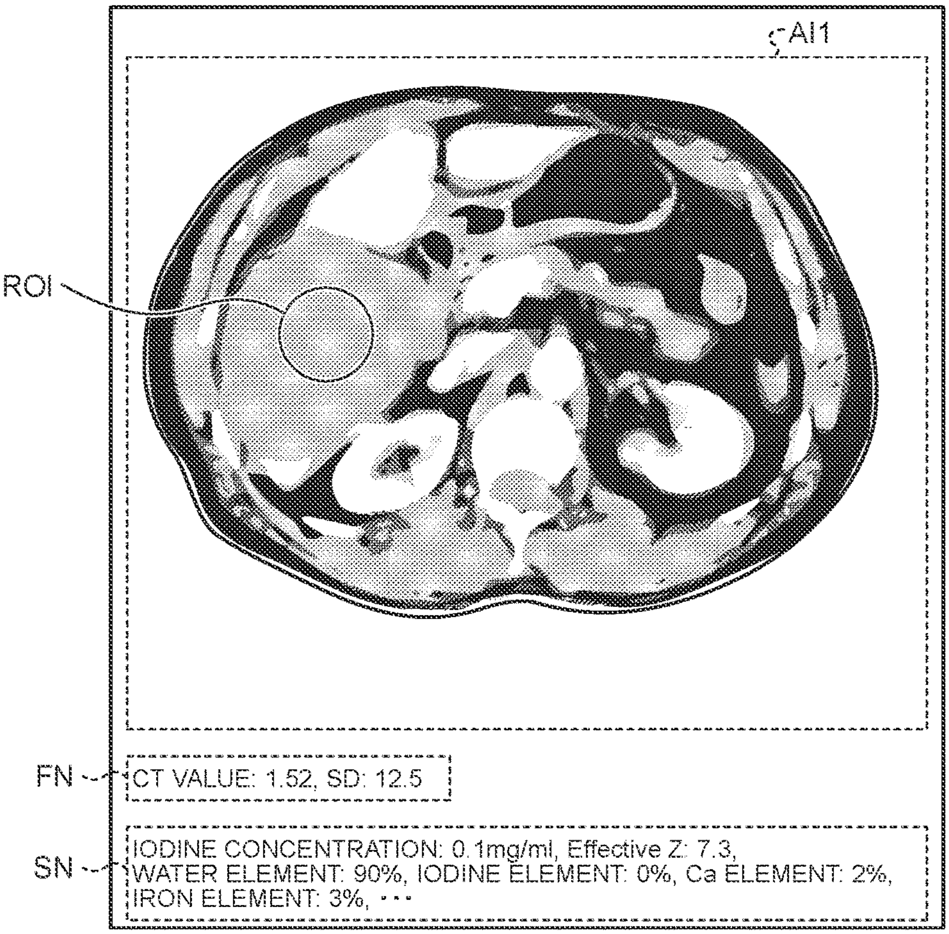
FIG. 7 is a diagram illustrating an example of a first numerical value and a second numerical value that are displayed on the display according to the embodiment.

By the display controlling function 446, the processing circuitry 44 causes the display 42 to display the first numerical values and the second numerical values that are calculated. FIG. 7 is a diagram illustrating an example of first numerical values FN and second numerical values SN that are displayed on the display 42. As illustrated in FIG. 7, with respect to the ROI in the first image AI1, the first numerical values FN and the second numerical values SN are displayed together with the first image AI1 on the display 42.

Step S308

When the ROI on the first image is moved according to an instruction of the user via the input interface 43 (YES at step S308), the process of and after step S305 is repeated. Note that, when first items and second items are specified again, the process of and after step S304 is repeated. When the ROI on the first image is not moved (NO at step S308), the process of step S309 is executed.

Step S309

When a save button is pressed according to an instruction of the user via the input interface 43 (YES at step S309), the process of step S310 is executed. When a save button is not pressed according to an instruction of the user via the input interface 43 (NO at step S309), the process of step S308 is executed.

Step S310

By the managing function 447, the processing circuitry 44 manages the second image and the second numerical values in association with the first image. For example, when the first image is managed in the DICOM (Digital Imaging and Communications in Medicine) form, the managing function 447 manages the second image and the second numerical values in association with the first image, using the header information of the time-series data that relates to the first image. The managing function 447 may manage the second image and the second numerical values in association with the first image, using a DICOM private tag For example, when header information that relates to counting of X-ray photons is generated as a new tag in the DICOM header information, the managing function 447 manages the second image and the second numerical values in association with the first image, using the header information that relates to counting of X-ray photons. Accordingly, the second image and the second numerical values are stored in the memory 41 in association with the first image. In other words, the managing function 447 enables association of the second image and the second numerical values with the first image as appropriate.

Step S311

When display of the first image, the first numerical values, and the second numerical values is ended according to an instruction of the user via the input interface 43 (YES at step S311), the medical image processing ends. When display of the first image, the first numerical values, and the second numerical values is not ended according to an instruction of the user via the input interface 43 (No at step S311), the process of step S308 is repeated.

The processing apparatus 400 described above according to the embodiment reconstructs a first image based on scan data obtained by a multi-energy CT scan and causes the display 42 to display side by side, with respect to a ROI that is specified on the first image, a first numerical value obtained based on the first image and a second numerical value obtained based on a second image that is different from the first image and that is obtained based on the scan data. In the processing apparatus 400 according to the embodiment, the scan data is count data obtained by counting X-rays according to multiple energies and the second image is an image obtained using the count data corresponding to multi-energy of the X-rays. The processing apparatus 400 according to the embodiment manages the second image and the second numerical value in association with the first image, using header information of time-series data on the first image. For example, the processing apparatus 400 according to the embodiment manages the second image and the second numerical value in association with the first image, using header information on counting of X-ray photons.

Thus, according to the processing apparatus 400 according to the embodiment, it is possible to calculate the second numerical value and display the second numerical value on the display 42 without newly starting application software that relates to calculation of an analysis value (second numerical value) that relates to the second image, that is, without displaying an analysis screen that relates to the second image. Thus, according to the processing apparatus 400 according to the embodiment, it is possible to increase operability in calculation, display, and management of analysis values unique to scans enabling discrimination of multiple energies.

Thus, while one analysis result is displayed together with a medical image and only a calculation value of an ROI on the image can be displayed normally, according to the processing apparatus 400 of the embodiment, it is possible to display numerical values of various analysis results on the display 42 because a lot of analyses are performed by multi-energy CT scans. Thus, according to the processing apparatus 400 according to the embodiment, the throughput of diagnosis on the subject P increases and it is possible to increase efficiency in setting a treatment plan.

Modification 1

A difference from the embodiment is in causing the display 42 to display a scanogram corresponding to the subject P and calculating a second numerical value based on each of a plurality of second images contained in an area that is set in the scanogram.

Specifically, by the display controlling function 446, the processing circuitry 44 displays a scanogram of the subject P. A scanogram may be displayed at any time in the medical image processing illustrated in FIG. 3 as long as it is before analysis for the second numerical values. For example, in specifying an ROI, the input interface 43 receives an area that relates to calculation of the second numerical value (referred to as a calculation area below) along the craniocaudal direction of the subject P (the Z-direction). By the calculating function 445, the processing circuitry 44 calculates the second numerical value based on each of the second images contained in the calculation area. The calculation area corresponds to an analysis subject area of the second images that relate to the second numerical value. Other processing is the same as that of the embodiment, and thus description thereof will be omitted.

In specifying a ROI, the processing apparatus 400 according to Modification 1 receives an area that relates to calculation of a second value along the craniocaudal direction of the subject P and calculates a second value based on each of the second images contained in the received area. Thus, according to the processing apparatus 400 according to Modification 1, it is possible to limit the analysis subject area in calculating the second numerical value and reduce the time for calculating the second numerical value. For this reason, according to the processing apparatus 400 according to Modification 1, it is possible to increase the throughput of examination on the subject P. Other effects are the same as those of the embodiment, and thus description thereof will be omitted.

Modification 2

Modification 2 is in specifying a slice position that relates to a disease of the subject P based on any one or both of an imaging protocol and an examination order and setting an image of an axial cross-section corresponding to a specified slice as a first image. Instead of the disease of the subject P, a purpose of examination may be used.

For example, by the image processing function 444, the processing circuitry 44 specifies a slice position that relates to the disease of the subject P based on the imaging protocol or the examination order. Specifically, the image processing function 444 specifies a part of the subject P that relates to the disease of the subject P based on the imaging protocol or the examination order. The image processing function 444 specifies a plurality of slice planes that relate to the specified part in volume data by, for example, segmentation processing. The image processing function 444 specifies a slice plane that is referred to for the disease (referred to as a reference slice plane below) among the slice planes by, for example, CAD (Computer Aided Diagnosis).

Based on the volume data, the image processing function 444 generates a cross-sectional image that relates to the reference slice plane as a first image. In a further modification of Modification 2, an iodine map image or a material discrimination image presenting a distribution of a specific material corresponding to the disease, such as any one or both of a set of iron and gold and platinum, may be used as the first image.

By the display controlling function 446, the processing circuitry 44 causes the display 42 to display an area that relates to the disease (for example, when the disease is cancer, a possible cancer area) in an enhanced manner in the generated first image. The enhanced display of the area is, for example, enhancing the area in a hue corresponding to a likelihood of the disease according to CAD. In a further modification of Modification 2, three-dimensional volume data, such as a rendering image, may be used as the first image. The area that relates to the disease is displayed as a three-dimensional area on the display 42.

According to the processing apparatus 400 according to Modification 2, it is possible to generate a first image based on any one or both of an imaging protocol and an examination order. Accordingly, it is possible to, with respect to setting of an ROI, generate and display an optimum first image based on any one or both of the imaging protocol and the examination order. According to the processing apparatus 400 according to Modification 2, for example, because the first image that is the result of processing by CAD is displayed together with the second numerical value on the display 42, it is possible to present information beneficial to determine treatment and diagnosis to the user according to how much the anticancer drug works (imaging of a platinum element according to material discrimination), inhibition of a blood flow to a cancer area (imaging of an iron element), or the like.

This makes it possible to increase efficiency in determining a slice plane and setting an ROI by the user. For this reason, according to the processing apparatus 400 according to Modification 2, operability to the user increases, which makes it possible to increase the throughput of an examination on the subject P. Other effects are the same as those of the embodiment, and thus description thereof will be mitted.

Modification 3 is in using multi planar reconstruction (MPR) images as a first image in the medical image processing. The MRP images are, for example, orthogonal three-dimensional images that relate to a reference position. The orthogonal three-dimensional images are, for example, an axial plane image on an axial plane, a coronal plane image on a coronal plane containing a site of imaging in the subject P, and a sagittal planar image on a sagittal plane containing the site of imaging of the subject P. Note that the first image is not limited to MRP images, and the first image may be a curved planar reconstruction (CPR) image. The planar images may be planar images of different sites.

Figure 8:
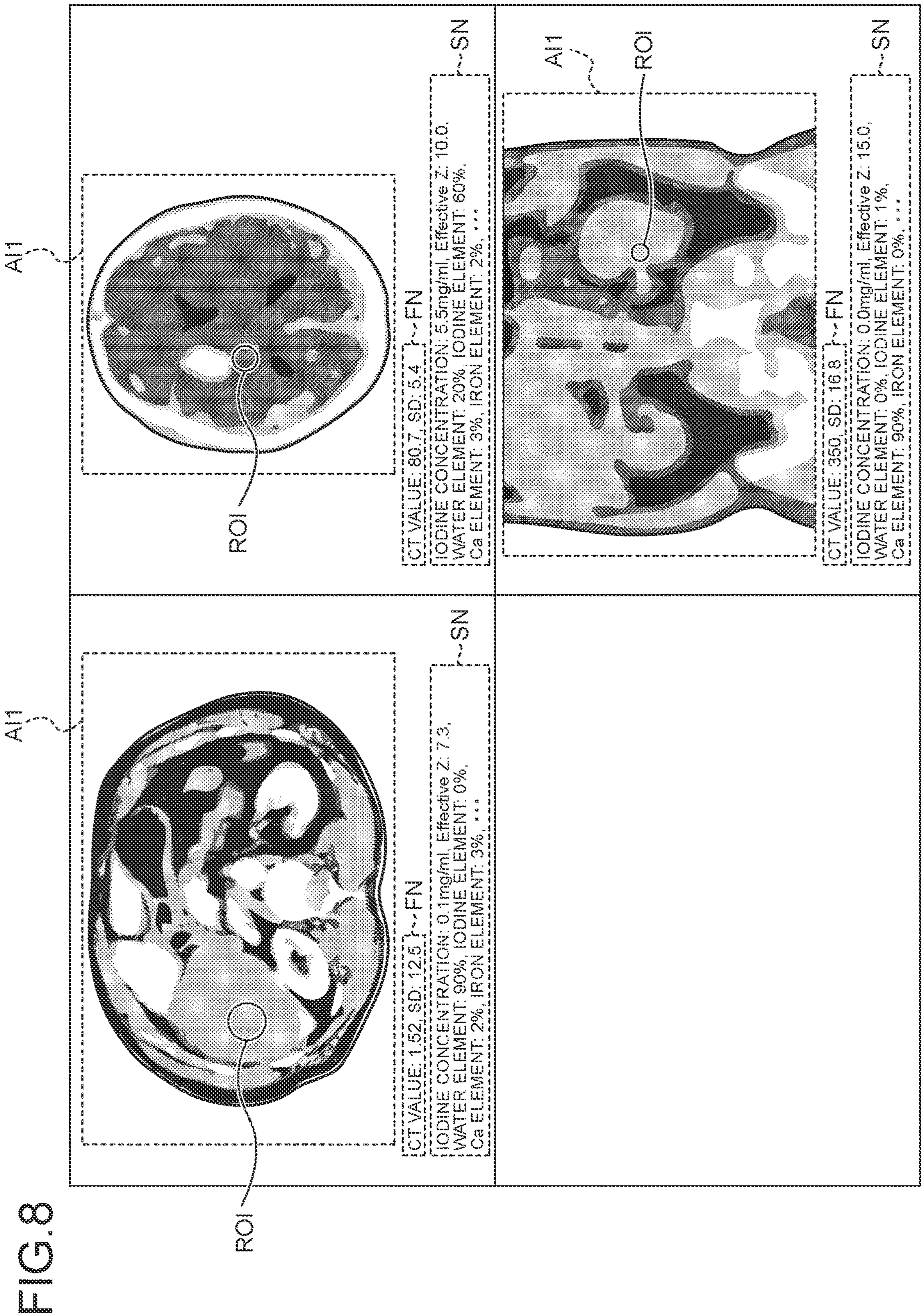
FIG. 8 is a diagram illustrating an example of displaying first numerical values and second numerical values on the display together with multi planar reconstruction images according to Modification 3.

FIG. 8 is a diagram illustrating an example of displaying first numerical values FN and second numerical values SN together with the multi planar reconstruction images. According to FIG. 8, the three planar images are displayed as the first image AI1. In Modification 3, as illustrated in FIG. 8, a ROI may be set on each of the multi planar images AI1.

According to the processing apparatus 400 according to Modification 3, using the planar images as the first image, it is possible to display the first numerical values FN and the second numerical values SN that relate to the ROI in each of the multi planar images. For this reason, according to Modification 3, with respect to the ROI in the multi planar images, the user is able to check the first numerical values FN and the second numerical values SN at a time and increase efficiency of examination on the subject P. Other effects are the same as those of the embodiment, and thus description thereof will be omitted.

Modification 4

Modification 4 is in displaying standard second items that are set previously on the specification screen. As for another second item, after analysis on a second image that relates to a second numerical value corresponding to the another second item completes, the another second item is selectable and displayable according to an instruction of the user via the input interface 43. In the medical image processing in Modification 4, the standard second items are displayed at step S304. At step S307, a second numerical value corresponding to a selected second item among the standard items is displayed on the display 42.

The calculating function 445 executes an analysis process on the second image with respect to a second numerical value corresponding to the another second item. The display controlling function 446 may cause the display 42 to display a progress indicator presenting a progress in calculating the second numerical value corresponding to the another second item together with the another second item. A known progress indicator may be usable as the progress indicator, and, for example, the progress indicator may be one presenting a remaining time until completion of analysis.

When the analysis process (calculation of the second numerical value) completes, the display controlling function 446 causes the display 42 to display a specification screen containing (enabling selection of) the another second item according to an instruction of the user. After calculation of the second numerical value corresponding to the another second item completes, the display controlling function 446 displays a specification screen containing (enabling selection of) the another second item on the display 42 by, for example, a pop-up. When the another second item is selected according to the instruction of the user via the input interface 43, the display controlling function 446 causes the display 42 to display the second numerical value corresponding to the another item that is selected.

According to the processing apparatus 400 according to Modification 4, when calculation of the second numerical value corresponding to the another second item completes, the another second item is turned into a selectable and displayable state. Thus, according to Modification 4, it is possible to cause the display 42 to display the second numerical value corresponding to the another second item in response to completion of calculation of the second numerical value corresponding to the another second item. For this reason, according to Modification 4, because it is possible to execute analysis and calculation of the second numerical value corresponding to the another second item without selecting the another second item, it is possible to shorten the time that relates to display of the second numerical value corresponding to the another second item. Thus, according to the processing apparatus 400 according to Modification 4, it is possible to further increase the throughput of the examination on the subject P. Note that other effects are the same as those of the embodiment, and thus description thereof will be omitted.

Modification 5

Modification 5 is in calculating a second numerical value automatically without selecting the second item. In the medical image process according to Modification 5, only a first item is selected at step S304. Specifying a second item is unnecessary at step S304. After generation of a second image, the calculating function 445 calculates a second numerical value. After calculation of the second numerical value completes, the display controlling function 446 causes the display 42 to display a screen having checkboxes for displaying a second numerical value (for example, the specification screen SS like that illustrated in FIG. 6). When a checkbox is checked according to an instruction of the user via the input interface 43, the display controlling function 446 causes the display 42 to display a second numerical value corresponding to the checked second item.

According to Modification 5, because it is possible to calculate a second numerical value without selecting a second item, it is possible to further increase the throughput of the examination on the subject P. Note that other effects are the same as those of the embodiment, and thus description thereof will be omitted.

Modification 6

In Modification 6, the second item in Modification 5 is set previously as a prior item in analysis before the medical image processing is performed. The prior item is set previously according to an instruction of the user via the input interface 43 according to, for example, a name of disease of the subject P or a purpose of examination. The process procedure in Modification 6 is similar to that of Modification 5 and thus description thereof will be omitted. According to Modification 6, because the prior item is set previously, it is possible to reduce the workload of the user in the medical image processing and further increase the throughput of an examination on the subject P. Note that other effects of Modification 6 are the same as those of the embodiment, and thus description thereof will be omitted.

Application 1

Application 1 is in setting a second item according to an imaging protocol. For example, according to Application 1, the image type of a second image to be analyzed for a second numerical value and an item of the second numerical value are preset according to the imaging protocol in a multi-energy CT scan. Specifically, the memory 41 stores a correspondence table of the second item corresponding to the imaging protocol and a second image that relates to the second item. Note that the memory 41 may store a correspondence table of the second item corresponding to a scan condition and a second image that relates to the second item. Thus, according to Application 1, the second item and the second image that relates to the second item are preset based on the imaging protocol that is set and the correspondence table.

In the medical image processing according to Application 1, the process of step S306 is unnecessary. On the other hand, when a second image is reconstructed, by the calculating function 445, the processing circuitry 44 calculates a second numerical value over the first image based on the second image. Subsequently, when a second item is specified, by the display controlling function 446, the processing circuitry 44 executes the process of step S307.

According to the processing apparatus 400 according to Application 1, the image type of a second image to be analyzed for a second numerical value and an item of the second numerical value are preset according to the imaging protocol in a multi-energy CT scan. Accordingly, according to the processing apparatus 400 of Application 1, because it is possible to calculate a second numerical value according to generation of a second image without setting an item of a second numerical value to be analyzed by the user, it is possible to further reduce the workload of the user in the medical image processing and further increase the throughput of an examination on the subject P. Note that other effects of Application 1 are the same as those of the embodiment, and thus description thereof will be omitted.

Application 2

Application 2 is in automatically calculating second numerical values corresponding to some second items that can be output among second items that are preset. Some second items that can be output can be set as appropriate, for example, according to a purpose of examination on the subject P. For example, by the calculating function 445, based on a second image, the processing circuitry 44 calculates second numerical values corresponding to some items that can be output among the preset second items. Some items that can be output can be set as appropriate according to the purpose of examination on the subject P.

By the display controlling function 446, the processing circuitry 44 causes the display 42 to further display a list of some items that can be output among the preset second items. The list of the items are displayable at any timing, such as, before performance of the medical image processing or during the performance.

According to the processing apparatus 400 according to Application 2, second numerical values corresponding to some items that can be output among the preset second items are calculated based on the second image. Accordingly, in Application 2, because second numerical values to be calculated are limited, it is possible to increase efficiency in calculating the second numerical values.

According to the processing apparatus 400 according to Application 2, it is possible to cause the display 42 to further display the list of some items that can be output among the preset second items. Accordingly, the user is able to check some items that can be output and make an analysis appropriately on second numerical values (calculation of the second numerical values) as required.

Accordingly, according to the processing apparatus 400 of Application 2, it is possible to further increase the throughput of the examination on the subject P. Note that other effects in Application 2 are the same as those of the embodiment, and thus description thereof will be omitted.

Application 3

Application 3 is in, when an item different from some items that can be output among the preset second items is selected, calculating a second numerical value corresponding to the different item based on the second image. In order to specify the description, it is assumed that the preset second items are an iodine concentration, an atomic number, and a water element, an iodine element, a calcium element (Ca element) and an iron element (Fe element) in material discrimination. It is also assumed that the different item is an electron density.

In this case, at step S304, the specification screen SS is, for example, as illustrated in FIG. 6, in a state where the item of the electron density is not checked on the display of the list of the second items. When the item of the electron density that is not checked is selected according to an instruction of the user via the input interface 43, the processing circuitry 44 calculates a second value representing an electron density by the calculating function 445. In other words, when an item different from some items that can be output among the preset second items is selected, the calculating function 445 calculates a second numerical value corresponding to the selected different item based on the second image.

According to the processing apparatus 400 of Application 3, when the item different from some items that can be output among the preset second items is selected, it is possible to calculate the second numerical value corresponding to the different item based on the second image. In other words, according to the processing apparatus 400 of Application 3, it is possible to execute the analysis process of calculating the second numerical value in response to selection of the item that is not to be analyzed automatically. For this reason, according to the processing apparatus 400 of Application 3, it is possible to increase usability of the medical image processing by the user and further increase the throughput of the examination on the subject P. Note that other effects of Application 3 are the same as those of the embodiment, and thus description thereof will be omitted.

When a technical idea in the embodiment is realized using a processing method for a medical image that is obtained by a multi-energy CT scan, the processing method reconstructs a first medical image based on scan data obtained by a multi-energy CT scan and causes the display 42 to display side by side, with respect to an area of interest that is specified on the first image, a first numerical value obtained based on the first image and a second numerical value obtained based on a second image that is different from the first image and that is obtained based on the scan data. The procedure and the effects of the medical image processing that is executed by the processing method for a medical image obtained by a multi-energy CT scan are the same as those of the embodiment, and thus description thereof will be omitted.

When a technical idea in the embodiment is realized using a program for processing a medical image that is obtained by a multi-energy CT scan, the program causes a computer to implement reconstructing a first medical image based on scan data obtained by a multi-energy CT scan and causing the display 42 to display side by side, with respect to an area of interest that is specified on the first image, a first numerical value obtained based on the first image and a second numerical value obtained based on a second image that is different from the first image and that is obtained based on the scan data. The program for processing a medical image that is obtained by a multi-energy CT scan, for example, is stored in a computer-readable non-volatile storage medium.

For example, the medical image processing may be realized by installing the program for processing a medical image that is obtained by a multi-energy CT scan from the non-volatile storage medium into various types of server devices (processing apparatus) that relate to medical data processing and loading the program into a memory. In this case, it is also possible to store the program that enables a computer to execute the method in a storage medium, such as a magnetic disk (hard disk), an optical disk (CD-ROM or a DVD), or a semiconductor memory, and distribute the program. The procedure and the effects of the medical image processing that is executed by the program for processing a medical image obtained by a multi-energy CT scan are the same as those of the embodiment, and thus description thereof will be omitted.

According to at least one of the embodiment, etc., it is possible to increase operability in calculation and display of analysis values unique to scans enabling discrimination of multiple energies.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A processing apparatus for a medical image that is obtained by a multi-energy CT scan, comprising:

processing circuitry that reconstructs a first image based on scan data that is obtained by a multi-energy CT scan;

calculates, for an area of interest specified in the first image, a first numerical value based on the first image;

calculates, an the area of interest, in a second image, that is a same as the area of interest specified in the first image, a second numerical value based on the second image, the second image being obtained based on the scan data and being different from the first image; and causes a display to display, side by side, the first numerical value and the second numerical value.

2. The processing apparatus according to claim 1, wherein the scan data is count data obtained by counting X-rays according to multiple energies, and the second image is an image obtained using the count data corresponding to the multiple energies of the X-rays.

3. The processing apparatus according to claim 1, further comprising an input interface that receives an area that relates to calculation of the second numerical value along a craniocaudal direction of a subject in specification of the area of interest, wherein the processing circuitry calculates the second numerical value based on each of a plurality of the second images contained in the area.

4. The processing apparatus according to claim 1, wherein an image type of a second image to be analyzed for the second numerical value and an item of the second numerical value are preset according to an imaging protocol in the multi-energy CT scan.

5. The processing apparatus according to claim 4, wherein the processing circuitry calculates, based on the second image, the second numerical values corresponding to some items that can be output among items of the second numerical values that are preset.

6. The processing apparatus according to claim 5, wherein, when an item different from the some items that can be output among the items of the second numerical values that are preset is selected, the processing circuitry calculates the second numerical value corresponding to the different item based on the second image.

7. The processing apparatus according to claim 5, wherein the processing circuitry causes the display to further display a list of the some items that can be output among the items of the second numerical values that are preset.

8. The processing apparatus according to claim 1, wherein the first image is an energy cumulative image corresponding to all energies that are cumulated over multiple energies or three-dimensional volume data corresponding to the all energies.

9. The processing apparatus according to claim 1, wherein the processing circuitry manages the second image and the second numerical value in association with the first image, using header information of time-series data that relates to the first image.

10. The processing apparatus according to claim 1, wherein the processing circuitry manages the second image and the second numerical value in association with the first image using header information that relates to counting of X-ray photons.

11. A processing method for a medical image that is obtained by a multi-energy CT scan, comprising:

generating a first image based on scan data obtained by a multi-energy CT scan;

calculating, for an area of interest specified in the first image, a first numerical value based on the first image;

calculating, for an area of interest, in a second image, that is a same as the area of interest specified in the first image, a second numerical value based on the second image, the second image being obtained based on the scan data and being different from the first image; and causing a display to display, side by side, the first numerical value and the second numerical value.

12. The processing apparatus according to claim 1, wherein the processing circuitry causes the display to display the first numerical value and the second numerical value, along with the first image, without the second image being displayed.

* * * * *